(12) United States Patent
Boisson et al.

(10) Patent No.: US 10,727,706 B2
(45) Date of Patent: Jul. 28, 2020

(54) ELECTRIC MACHINE COMPRISING A STATOR PROVIDED WITH AN INNER TUBULAR SLEEVE

(71) Applicants: IFP Energies nouvelles, Rueil-Malmaison (FR); MAVEL S.r.l., Pont Saint Martin (AO) (IT)

(72) Inventors: Julien Boisson, Rueil Malmaison (FR); Benjamin Gaussens, Buc (FR); Misa Milosavljevic, Eragny sur Oise (FR); Fabrice Le Berr, Rueil Malmaison (FR); Davide Bettoni, Settimo Vittone (IT); Luca Favre, Valpelline (IT)

(73) Assignee: IFP Energies nouvelles, Rueil-Malmaison (FR)

( * ) Notice: Subject to any disclaimer, the term of this patent is extended or adjusted under 35 U.S.C. 154(b) by 86 days.

(21) Appl. No.: 16/133,073

(22) Filed: Sep. 17, 2018

(65) Prior Publication Data
US 2019/0089211 A1 Mar. 21, 2019

(30) Foreign Application Priority Data
Sep. 18, 2017 (FR) ..................................... 17 58618

(51) Int. Cl.
| H02K 1/20 | (2006.01) |
| H02K 7/18 | (2006.01) |
| H02K 1/16 | (2006.01) |
| H02K 1/22 | (2006.01) |
| H02K 5/128 | (2006.01) |
| H02K 3/487 | (2006.01) |

(Continued)

(52) U.S. Cl.
CPC .............. *H02K 1/20* (2013.01); *H02K 1/165* (2013.01); *H02K 1/22* (2013.01); *H02K 3/28* (2013.01); *H02K 3/487* (2013.01); *H02K 5/128* (2013.01); *H02K 7/088* (2013.01); *H02K 7/1823* (2013.01); *H02K 9/19* (2013.01); *H02K 9/06* (2013.01); *H02K 9/18* (2013.01); *H02K 2005/1287* (2013.01)

(58) Field of Classification Search
CPC .. H02K 1/20; H02K 1/32; H02K 3/28; H02K 3/487; H02K 1/165; H02K 1/22; H02K 5/128; H02K 7/088; H02K 7/1823; H02K 9/19; H02K 9/06; H02K 9/18; H02K 2005/1287

See application file for complete search history.

(56) References Cited

U.S. PATENT DOCUMENTS

| 8,368,273 B2 * | 2/2013 | Hino ...................... H02K 1/276 |
| | | 310/156.47 |
| 10,044,241 B2 * | 8/2018 | Nakatake ............... H02K 3/522 |

(Continued)

FOREIGN PATENT DOCUMENTS

| DE | 102006008423 A1 | 8/2007 |
| FR | 3041831 A1 | 3/2017 |

(Continued)

*Primary Examiner* — Jeremy A Luks
(74) *Attorney, Agent, or Firm* — Fitch, Even, Tabin & Flannery LLP

(57) ABSTRACT

The present invention is an electric machine comprising a rotor and a stator. The stator comprises radial passages, magnetic flux generators and a tubular sleeve. According to the invention, the inner surface of tubular sleeve is smooth.

30 Claims, 3 Drawing Sheets

(51) Int. Cl.
    *H02K 9/19*     (2006.01)
    *H02K 7/08*     (2006.01)
    *H02K 3/28*     (2006.01)
    *H02K 9/06*     (2006.01)
    *H02K 9/18*     (2006.01)

(56) References Cited

U.S. PATENT DOCUMENTS

| | | | |
|---|---|---|---|
| 2008/0042498 A1* | 2/2008 | Beer | H02K 1/20 310/400 |
| 2008/0289333 A1 | 11/2008 | Godeke et al. | |
| 2009/0022610 A1 | 1/2009 | Materne et al. | |
| 2013/0043745 A1 | 2/2013 | Hussain et al. | |
| 2013/0169074 A1 | 7/2013 | Hussain et al. | |
| 2016/0111922 A1* | 4/2016 | Hattori | H02K 1/185 310/216.113 |
| 2018/0076679 A1* | 3/2018 | Matsumoto | H02K 3/487 |
| 2018/0115222 A1* | 4/2018 | Lassila | H02K 1/146 |
| 2018/0233977 A1* | 8/2018 | Volkmuth | H02K 1/325 |
| 2018/0269744 A1* | 9/2018 | Favre | H02K 5/12 |
| 2019/0006894 A1* | 1/2019 | Kobayashi | H02K 5/24 |

FOREIGN PATENT DOCUMENTS

| | | |
|---|---|---|
| FR | 3048022 A1 | 8/2017 |
| WO | 2017/050577 A1 | 3/2017 |

\* cited by examiner

ELECTRIC MACHINE COMPRISING A STATOR PROVIDED WITH AN INNER TUBULAR SLEEVE

CROSS REFERENCE TO RELATED APPLICATION

Reference is made to French Application No. 17/58.618 filed Sep. 18, 2017, which is incorporated herein by reference in its entirety.

BACKGROUND OF THE INVENTION

Field of the Invention

The present invention relates to a rotary electric machine comprising a rotor and a stator.

Description of the Prior Art

Generally, a rotary electric machine conventionally comprises a stator and a rotor coaxially arranged relative to each other. The rotor has a rotor body carrying magnetic flux generators, such as permanent magnets or windings. The rotor is generally housed within the stator that carries magnetic flux generators in the form of electrical windings (or armature windings) for generating a magnetic field allowing the rotor to be driven in rotation in combination with the magnetic field generated by at least one magnet and the windings of the rotor. The stator conventionally comprises of radial slots extending in the direction of the rotor and extending axially along the circumference of the stator. These slots are intended to receive the armature windings that are fastened thereto in any known manner.

A type of electric machine with a large air gap between the rotor and the stator is known which has an air gap that may sometimes be several centimeters long which allows passage of a gaseous or liquid fluid therethrough.

This type of machine is notably known from United States published patent applications 2008/0289,333, 2013/0169,074 and 2013/0043,745 which disclose synchro-reluctant machines with large air gaps operating at low speed. The large air gap allows a fluid to be driven therethrough.

However, a large air gap represents a drawback for providing passage of the magnetic flux between the rotor and the stator, and it therefore involves a limitation of the intrinsic efficiency of the machine as well as the size of the stator for the same power output.

In order to overcome the aforementioned drawbacks, an electric machine with a small air gap allowing better energy conversion between the stator and the rotor, and with possible fluid passage through the machine, has been developed. This type of machine is notably known from patent application FR-3,041,831. This type of machine is satisfactory notably because the radial passages of the stator, delimited on either side by teeth for transmitting the stator flux, in the form of a tubular sleeve in which the rotor is inserted. However, it is desirable to further improve the performances of the electrical machine, notably by limiting the iron losses, the magnetic losses and the aerodynamic losses of the electric machine, and to facilitate its assembly to limit the cost thereof.

SUMMARY OF THE INVENTION

To achieve these objectives, the present invention relates to an electrical machine comprising a rotor and a stator. The stator comprises radial passages, magnetic flux generators and a tubular sleeve. According to the invention, the tubular sleeve can be made of a ferromagnetic material which promotes passage of the magnetic field, and thus limits magnetic losses, or to the contrary of a non-magnetic material which prevents short circuits between the teeth. Furthermore, the inner surface of the tubular sleeve (i.e. the surface opposite the rotor) is smooth to limit aerodynamic losses. Moreover, the tubular sleeve contributes to the mechanical strength of the stator and notably to the strength of the stator teeth.

The invention relates to an electrical machine comprising a rotor and a stator, the stator including radial passages circumferentially arranged along the stator, magnetic flux generators housed in the radial passages, an inner tubular sleeve receiving the rotor, the radial passages comprising fluid circulation galleries (passages) opposite the magnetic flux generators. The inner surface of the tubular sleeve is smooth.

According to an embodiment of the invention, the outer surface of the rotor is smooth.

According to an implementation, the radial passages are delimited by stator teeth, an outer edge of the stator and the tubular sleeve.

Advantageously, the tubular sleeve is an insert integral with the stator teeth, notably in a form of wedges or of a cylindrical hoop.

According to an aspect, the fluid circulation galleries passages are delimited by the stator teeth, the outer edge of the stator and the magnetic flux generators.

According to a characteristic, the tubular sleeve is made of a ferromagnetic material.

Alternatively, the tubular sleeve is made of a non-magnetic material.

Preferably, the thickness of the tubular sleeve ranges between 0.1 mm and 5 mm.

According to an embodiment, each radial passage comprises two magnetic flux generators.

Advantageously, the magnetic flux generators are connected to electrical phases and each radial passage comprises two magnetic flux generators connected to the same electrical phase.

In a variant, the magnetic flux generators are connected to multiple electrical phases, and the circumferential distribution of the radial passages comprises an alternation of radial passages including two magnetic flux generators connected to the same electrical phase and of radial passages including two magnetic flux generators connected to two different electrical phases.

Alternatively, the stator comprises twelve radial passages and the magnetic flux generators are connected to three electrical phases, and the circumferential distribution of the magnetic flux generators within the radial passages is as follows:

a) the first radial passage comprises two magnetic flux generators connected to the first electrical phase;
b) the second radial passage comprises a magnetic flux generator connected to the second electrical phase and a magnetic flux generator connected to the first electrical phase;
c) the third radial passage comprises two magnetic flux generators connected to the second electrical phase;
d) the fourth radial passage comprises a magnetic flux generator connected to the third electrical phase and a magnetic flux generator connected to the second electrical phase;

e) the fifth radial passage comprises two magnetic flux generators connected to the third electrical phase;

f) the sixth radial passage comprises a magnetic flux generator connected to the first electrical phase and a magnetic flux generator connected to the third electric phase; and g) the seventh to twelfth radial passages according to the circumferential distribution are symmetrical to the first six radial passages in relation to the center of the stator.

According to an aspect of the invention, the fluid is a liquid or gaseous fluid for cooling the electrical machine.

Advantageously, the electrical machine comprises a cooling system arranged on the outer part of the stator close to the magnetic flux generators.

Preferably, the magnetic flux generators are armature windings.

Furthermore, the invention relates to an electrical compressor comprising an electrical machine according to one of the above characteristics and a compressor.

The invention also relates to an electrical turbine comprising an electrical machine according to one of the above characteristics and a turbine.

The invention further relates to an electrical turbocharger comprising an electrical machine according to one of the above characteristics, a turbine and a compressor.

BRIEF DESCRIPTION OF THE DRAWINGS

Other features and advantages of the electrical machine according to the invention will be clear from reading the description hereafter of embodiments, given by way of non limitative example, with reference to the accompanying figures wherein.

DETAILED DESCRIPTION OF THE INVENTION

Figure 1:
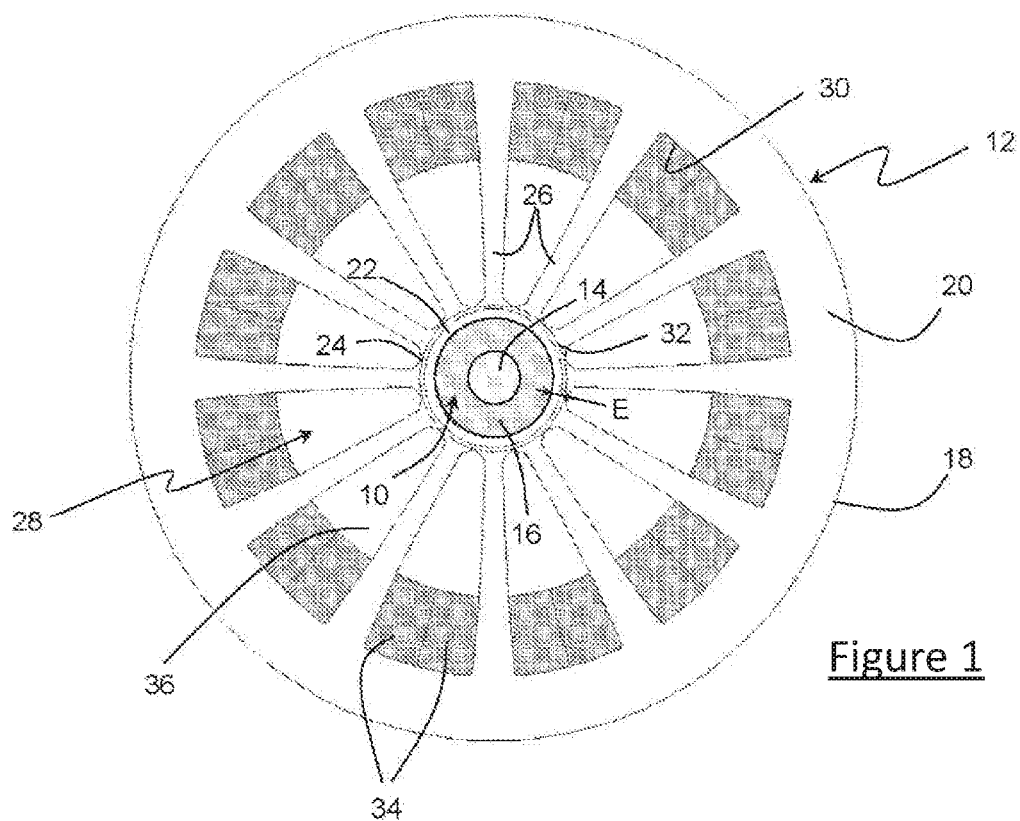
FIG. 1 illustrates an electrical machine according to a first embodiment of the invention.

FIG. 1 schematically illustrates, by way of non limitative example, an electrical machine according to an embodiment of the invention. The rotary electrical machine illustrated in FIG. 1, here an electrical motor by way of example, comprises a rotor 10 and a stator 12 which, when mounted, fit into each other while being coaxial and the rotor is freely rotatable.

This machine is only by way of example in the description hereafter a one-pole-pair synchronous machine.

This does not in any way exclude any other electrical machine comprising more pole pairs, or wound-rotor or squirrel-cage-rotor asynchronous machines.

The rotor of the machine according to FIG. 1 comprises, in a manner known per se, a shaft 14, preferably magnetic, on which is arranged a stack of flat ferromagnetic sheets or a single piece of ferromagnetic material or a magnet or a combination of these configurations, which are assembled in any known way to form a rotor body 16. For the embodiment of FIG. 1, rotor body 16 is a magnetic shaft and a magnet.

This rotor carries magnetic flux generators, mainly permanent magnets of length substantially equal to the axial length of the rotor body.

The stator comprises a pile or stack of flat ferromagnetic sheets 20 that are connected to one another in any known way to form a tubular stator body 18.

The stator body comprises a hollowed-out central part 22 delimited by a tubular sleeve 24 (also referred to as tubular bearing) within which the rotor is housed. According to the invention, tubular sleeve 24 can be made by connecting the teeth 26 with one another or by use of an insert which contributes to the mechanical strength of the stator and notably the strength of the stator teeth.

An air gap E is thus achieved between the outer periphery of rotor 10 and the inner periphery of tubular sleeve 24 of stator 12.

Furthermore, the inner surface of tubular sleeve 24 is smooth. Thus, tubular sleeve 24 is a perfectly smooth cylindrical tube in which rotor 10 is rotated. This smooth surface limits aerodynamic losses that can be high at high engine speeds (100,000 rpm and beyond).

According to an aspect of the invention, tubular sleeve 24 can be made of a ferromagnetic material. This design of stator 12 with a tubular sleeve 24 made of ferromagnetic material globally decreases the iron losses at the rotor, which may be significant when operating at high speed, and transfers the iron losses from the rotor to the stator, where it is generally easier to remove them by use of a suitable cooling system, notably within the context of a machine with a stator grid traversed by an air stream for cooling.

Alternatively, tubular sleeve 24 can be made of a non-magnetic material, which mainly provides stator mechanical reinforcement and limits aerodynamic losses.

Thus, the electrical machine according to the invention exhibits high efficiency while limiting electrical machine system losses, more specifically rotor losses and aerodynamic losses in the air gap, which are close to the rotor, and are generally difficult to remove. This allows maintaining electrical machine operation at moderate temperature of the rotor and to use more efficient magnets, which generally are more sensitive to high temperature, that allows the intrinsic performance of the electric machine to be increased.

Stator body 18 is connected to tubular sleeve 24 by circumferentially distributed stator teeth 26 (also referred to as radial webs). By way of non limitative example, stator 12 of FIG. 1 comprises twelve stator teeth placed at 30° to each other. The stator teeth delimit radial passages 28 of substantially triangular shape with the apex directed towards tubular sleeve 24. These passages extend radially from inner edge 30 of annular yoke 20 to inner edge 32 of the bearing and extend axially along stator body 18.

According to an embodiment of the invention, the outer surface of rotor 10 is smooth. Thus, air gap E is delimited by two perfectly cylindrical surfaces on the inner part of stator 12 and the outer part of rotor 10. This characteristic limits aerodynamic losses, which are notably high at high engine speed.

According to an implementation of the invention and depending on the power requested from the machine, tubular sleeve 24 can have a thickness ranging between 0.1 and 5 mm so which provides thin magnetic bridges. It is thus possible to reduce the induction harmonics at the rotor (with iron loss transfer to the stator).

As illustrated in FIG. 1, stator 12 comprises magnetic flux generators 34, for example armature windings 34, preferably liquid tight or with protection, that are housed in radial passages 28 and more precisely in the vicinity adjacent to inner edge 30 of the annular yoke. According to an implementation of the invention, magnetic flux generators 34 can rest against inner edge 30 of annular yoke 20. This configuration allows large-size radial passages 28 enabling passage of a fluid in the electrical machine, notably for cooling thereof, or for feeding a compressor or a turbine expansion system. Thus, the cooling system is simplified as a result of the fluid flowing through the electrical machine and limits losses at the rotor while allows substantial cooling thereof or even allowing for use of a rotor without cooling if the convection and the structural diffusion within the electric machine allow the losses to be removed.

Stator teeth 26 are of length which permits the magnetic flux generators 34 to be positioned away from magnetic flux generators 34. Furthermore, these stator teeth 26 which extends toward the rotor 10 to transmit the magnetic flux generated by magnetic flux generators 34 (windings) to be positioned away from this rotor 10.

Thus, the dimension of air gap E is reduced (some tenths of a millimeter), which allows the efficiency and the performance of the electrical machine to be optimized.

The axial fluid circulation galleries or channels 36 are thus formed between the windings. The outer edge of tubular sleeve 24 and stator teeth 26 form a stator grid (with closed slots) allowing passage of a cooling fluid such as a gaseous or liquid fluid.

This provides integration of at least one of a gas or fluid stream for cooling of the machine, which therefore optimizes positioning in a given system constrained by at least one of space requirements and thermal release.

Furthermore, the magnetic characteristics of the electrical machine limit the mass of the rotor for a given performance level, notably in relation to a large air-gap machine, which allows limiting the mass and therefore the inertia of the rotor.

According to a characteristic, the electrical machine can further comprise a second cooling system (not shown) arranged on the outer part of stator 12, close to magnetic flux generators 34. This second cooling system can be achieved by the same fluid that flows through the electrical machine, or by another heat carrier. This characteristic allows the performance of the electrical machine to be increased. It is thus possible to provide a high power density electrical machine by notably increasing the current density.

Figure 2:
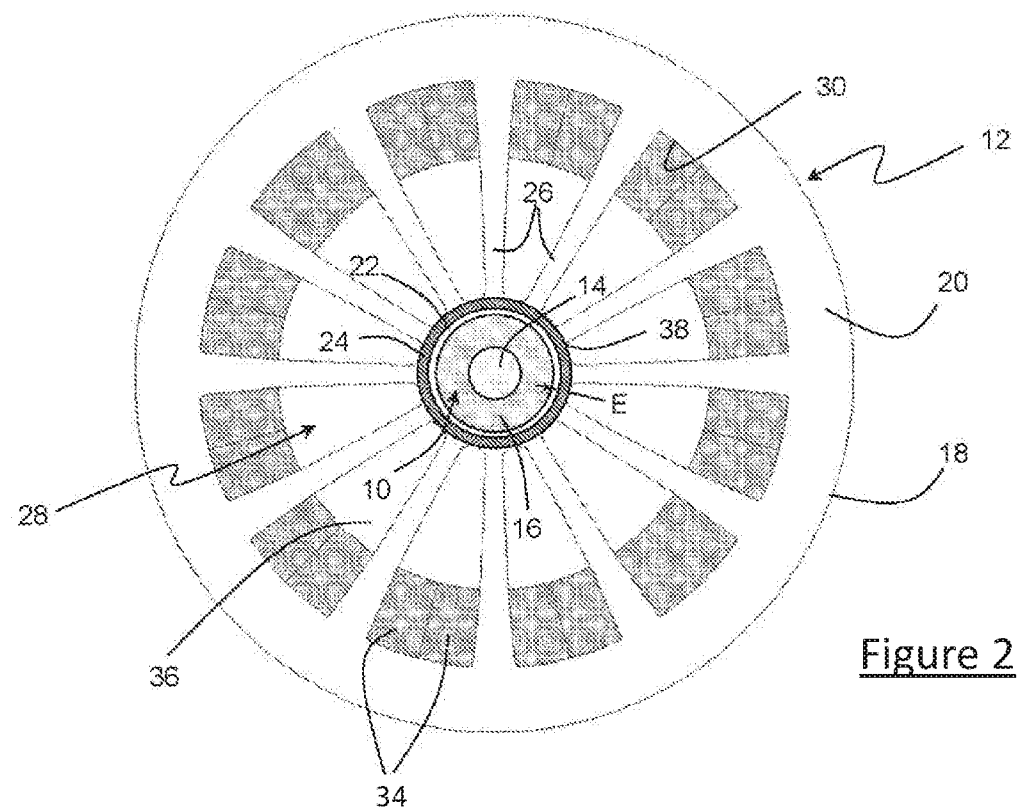
FIG. 2 illustrates an electrical machine according to a second embodiment of the invention.

FIG. 2 schematically illustrates, by way of non limitative example, an electrical machine according to a second embodiment of the invention. The electrical machine according to the second embodiment is identical to the electrical machine illustrated in FIG. 1, except for tubular sleeve 24. The identical elements described in connection with FIG. 1 are not described more in detail.

For this second embodiment, tubular sleeve 24 is made up of an insert 38 on stator teeth 26. Insert 38 can be wedges or a cylindrical hoop. Insert 38 provides closing of the slots of the stator grid formed by stator teeth 26.

Furthermore, insert 38 is made of a ferromagnetic material. The ferromagnetic material can be similar to or different from the ferromagnetic material of stator teeth 26.

This a posteriori closing of the slots provides benefits from the advantages of an open-slot structure, notably an automated winding involving a manufacturing cost reduction while achieving the advantages of a closed-slot structure, in particular loss reduction, notably at the rotor.

As illustrated in FIGS. 1 and 2, each radial passage 28 can comprise two magnetic flux generators 34. Magnetic flux generators 34 can be connected to electrical phases of a voltage inverter in order to generate a rotating magnetic field, which rotates rotor 10.

Figure 3:
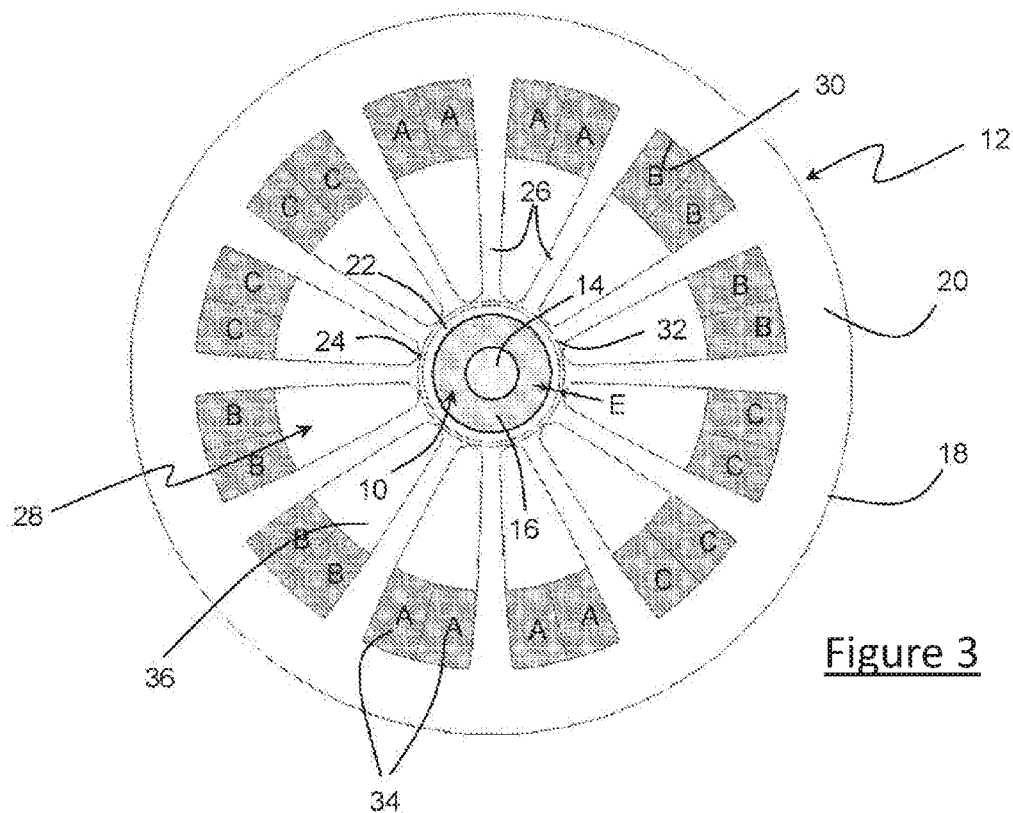
FIG. 3 illustrates a circumferential distribution of the magnetic flux generators according to a first variant embodiment of the invention.

FIG. 3 schematically illustrates, by way of non limitative example, a first connection variant between magnetic flux generators 34 and three electrical phases A, B, C for an electrical machine according to the embodiment of FIG. 1. Identical elements in relation to the electrical machine illustrated in FIG. 1 are not further described. This design is not limitative, notably the variant embodiment of FIG. 3 can be implemented with the embodiment of FIG. 2 to facilitate the assembly of magnetic flux generators 34. FIG. 3 corresponds to a connection to three electrical phases A, B, C. However the electrical machine could be connected to a different number of electrical phases, which are greater than or equal to two, four or six for example.

For the variant embodiment of FIG. 3, the two magnetic flux generators 34 of each radial passage are connected to the same electric phase A, B or C. Thus, in each radial passage 28, there are two flux generators connected to electrical phase A, or two magnetic flux generators 34 connected to electrical phase B, or two flux generators 34 connected to electrical phase C.

Preferably, the circumferential distribution of the connections between magnetic flux generators 34 and electrical phases A, B, C can be symmetrical relative to the center of stator 12. In other words, electrical phases A face each other by central symmetry, electrical phases B face each other by central symmetry and electrical phases C face each other by central symmetry.

For the example of FIG. 3, the circumferential distribution of magnetic flux generators 34 within the twelve radial passages is as follows:
  A first radial passage 28 comprising two magnetic flux generators 34 connected to electrical phase A;
  A second radial passage 28 comprising two magnetic flux generators 34 is connected to electrical phase A;
  A third radial passage 28 comprising two magnetic flux generators 34 is connected to electrical phase B;
  A fourth radial passage 28 comprising two magnetic flux generators 34 is connected to electrical phase B;
  A fifth radial passage 28 comprising two magnetic flux generators 34 is connected to electrical phase C;
  A sixth radial passage 28 comprising two magnetic flux generators 34 is connected to electrical phase C; and
  The seventh to twelfth radial passages 28 according to the circumferential distribution are symmetrical to the first six radial passages 28 in relation to the center of stator 12 (i.e. the seventh radial passage is identical to the first radial passage, the eighth radial passage is identical to the second radial passage, . . . , and the twelfth radial passage is identical to the sixth radial passage).

This variant is not limited to an embodiment with twelve radial passages 28. It can be adapted to any number of radial passages, in particular six, eighteen, etc., without departing from the scope of the invention.

Figure 4:
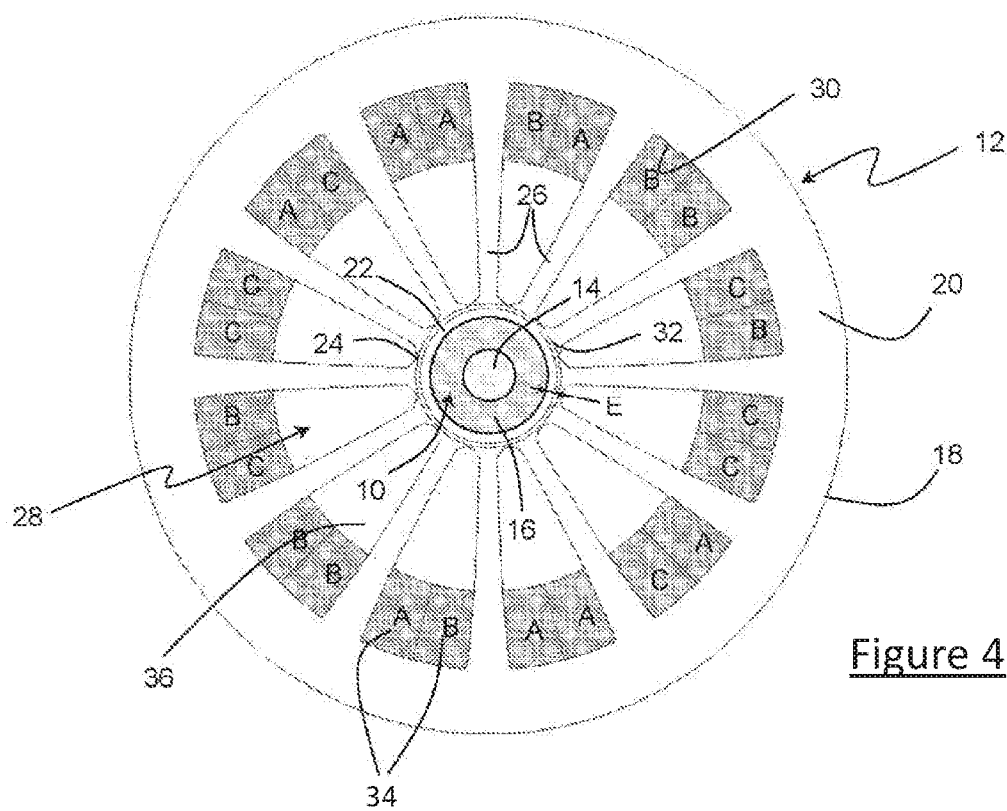
FIG. 4 illustrates a circumferential distribution of the magnetic flux generators according to a second variant embodiment of the invention.

FIG. 4 schematically illustrates, by way of non limitative example, a first variant connection between magnetic flux generators 34 and three electric phases A, B, C for an electrical machine according to the embodiment of FIG. 1. Identical elements in relation to the electrical machine illustrated in FIG. 1 are not described more in detail. This design is not limitative, notably the variant embodiment of FIG. 3 can be implemented with the embodiment of FIG. 2 to facilitate the assembly of magnetic flux generators 34. FIG. 4 corresponds to a connection to three electrical phases A, B, C, however the electrical machine could be connected to a different number of electrical phases, greater than or equal to two, four or six for example.

For the variant embodiment of FIG. 4, the circumferential distribution of the radial passages comprises an alternation of radial passages 28 including two magnetic flux generators 34 connected to the same electrical phase, and of radial passages including two magnetic flux generators 34 connected to two different electrical phases. In other words, for the first half of radial passages 28, the two magnetic flux generators 34 are connected to the same electrical phase, and for the second half of radial passages 28, the two magnetic flux generators 34 are connected to two different electrical phases with each radial passage 28 of the second half being arranged between two radial passages 28 of the first half.

Preferably, the circumferential distribution of the connections between magnetic flux generators 34 and electrical phases A, B, C can be symmetrical relative to the center of stator 12. In other words, electrical phases A face each other by central symmetry, electrical phases B face each other by symmetry and electrical phases C face each other by central symmetry.

For the example of FIG. 4, the circumferential distribution of magnetic flux generators 34 within the twelve radial passages 28 is as follows:
- A first radial passage 28 comprising two magnetic flux generators 34 is connected to electrical phase A;
- A second radial passage 28 comprising a magnetic flux generator 34 is connected to electrical phase B and a magnetic flux generator 34 connected to electrical phase A;
- A third radial passage 28 comprising two magnetic flux generators 34 is connected to electrical phase B;
- A fourth radial passage 28 comprising a magnetic flux generator 34 is connected to electrical phase C and a magnetic flux generator 34 connected to electrical phase B;
- A fifth radial passage 28 comprising two magnetic flux generators 34 is connected to electrical phase C;
- A sixth radial passage 28 comprising a magnetic flux generator 34 is connected to electric phase A and a magnetic flux generator 34 is connected to electric phase C, and
- The seventh to twelfth radial passages 28 according to the circumferential distribution are symmetrical to the first six radial passages 28 in relation to the center of stator 12 (that is the seventh radial passage is identical to the first radial passage, the eighth radial passage is identical to the second radial passage, . . . , and the twelfth radial passage is identical to the sixth radial passage).

This variant is not limited to an embodiment with twelve radial passages 28 and can be utilized for any number of radial passages, in particular six, eighteen, etc., without departing from the scope of the invention.

This circumferential distribution allows obtaining a more sinusoidal magnetomotive force than with the embodiment of FIG. 3, which allows limiting torque ripples, as well as iron losses at the rotor and the stator.

As illustrated in FIGS. 1 to 4, stator teeth 26 making up the stator grid can have an axial direction substantially parallel to the fluid flowing therethrough, that is substantially parallel to the longitudinal axis of the stator, so as to have the least possible influence on the direction of this fluid.

According to non-illustrated variant embodiments of the invention, the axial direction of these stator teeth can be inclined relative to the longitudinal axis of the stator.

Furthermore, this direction can also be a complex aerodynamic shape, such as a spiral shape, intended to guide, initiate or stop the motion of the fluid.

This spiral shape also allows increasing the contact surface between the stator teeth and the fluid.

Moreover, the spiral shape of the stator teeth appears to be appropriate from a magnetic viewpoint because it allows reduction of torque ripples according to the angle of inclination.

Furthermore, these stator teeth can also have an aerodynamic profile to minimize the pressure drop related to the flow of fluid through the grid, such as a sectional shape, a teardrop shape or an aircraft wing shape.

A surface treatment can be provided for the stator and the rotor in order to make this machine compatible with any type of fluid and any type of use in the transport industry, the food industry, the petroleum industry, the building sector and others requiring transport or guidance of a fluid through an electrical machine.

Regarding cooling of the electrical machine, the electrical machine architecture provides a very large exchange surface at the stator, allowing use of a simplified cooling system in comparison with a conventional electrical machine with similar performance, and potentially to increase the current density in view of the optimized cooling. Indeed, this architecture enables:
- At least one of passive or intrinsic cooling and
- active or passive additional cooling on the periphery of the stator yoke.

Due to its intrinsic advantages related to the geometry thereof, enabling the electrical machine to be contacted by a fluid and to position the stator flux generators radially away from the rotor flux generators. This type of electrical machine can be easily integrated in an existing system with minor integration-related modifications.

According to an example embodiment of the invention, the electrical machine can be compactly associated with a compressor in an electrical compressor, electrical turbine or electrical turbocharger architecture. This compactness is pertinent when the system must operate at very high engine speed, which requires reducing to the maximum extent at least one of the length and the mass and inertia of the rotating shafts.

Figure 5:
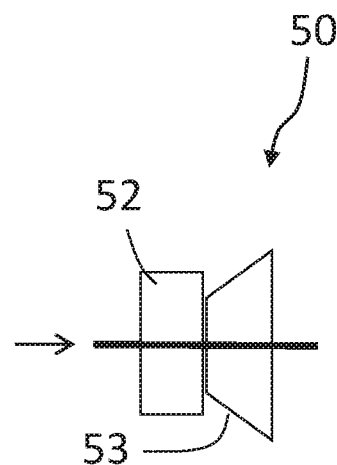
FIG. 5 illustrates an application of an electrical machine in accordance with the invention which drives a compressor.

FIG. 5 illustrates an application 50 of an electrical machine 52 in accordance with the invention which drives a compressor 53. An arrow pointing axially to the right represents cooling fluid flow into the radial passages 28 of the electrical machine 52.

Figure 6:
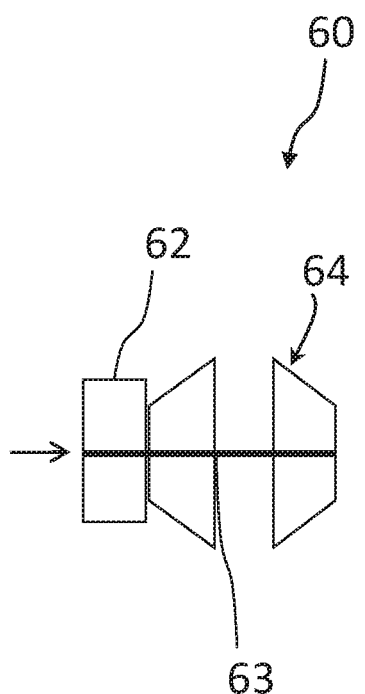
FIG. 6 illustrates another application of an electrical machine in accordance with the invention which drives a turbine and a compressor.

FIG. 6 illustrates another application 60 of an electrical machine 62 in accordance with the invention which drives a compressor 63 and a turbine 64. An arrow pointing axially to the right represents cooling fluid flow into the radial passages 28 of the electrical machine 62.

Figure 7:
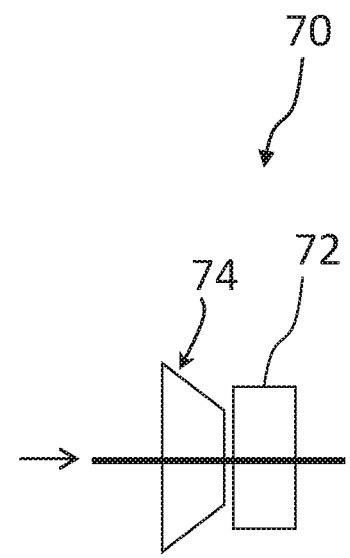
FIG. 7 illustrates another application of an electrical machine in accordance with the invention which drives a turbine.

FIG. 7 illustrates another application 70 of an electrical machine 72 in accordance with the invention which drives a turbine 74. An arrow pointing axially to the right represents cooling fluid flow into the radial passages 28 of the electrical machine 72.

Application Example

The features and advantages of the electrical machine according to the invention will be clear from reading the application example hereafter.

In this example, an open-slot electrical machine (according to the prior art AA) is compared to a closed-slot electrical machine according to the invention INV (with the smooth tubular sleeve made of ferromagnetic material according to the example of FIG. 1). The two electrical machines are identical, except for the opening or closing of the slots. Both electrical machines are made of NO20 steel sheets.

Table 1 illustrates the impact of the slot closing on the iron loss levels. In this table, Ipeak corresponds to the maximum current in the phase and psi corresponds to the deflux angle.

TABLE 1

| | | | | Iron losses | | | | |
|---|---|---|---|---|---|---|---|---|
| | | | | | Iron losses | | | |
| | Ipeak (A) | Psi (°) | Zone | hysteresis (W) | conventional (W) | excess (W) | Total (W) | Sum (W) |
| AA | 300 | 60 | stator | 225.7 | 47.2 | 151.1 | 425 | 619.1 |
| | | | rotor | 22.3 | 47.5 | 124.4 | 194.1 | |
| INV | 300 | 60 | stator | 237.6 | 48.1 | 156 | 441.7 | 584.6 |
| | | | rotor | 13.8 | 30.9 | 98.3 | 143 | |

It is noted that, globally, the iron losses decrease for the electrical machine according to the invention. It can be observed that the iron losses at the rotor decrease by a value of the order of 26%. At the same time, the iron losses at the stator only increase by 4%.

The invention claimed is:

1. An electrical machine comprising a rotor and a stator, the stator including radial passages circumferentially arranged around the stator with each radial passage being bordered by a pair of stator teeth extending radially inward toward the rotor, magnetic flux generators housed in the radial passages, an inner tubular sleeve which is an insert integral with the stator teeth which receive the rotor with the stator teeth engaging a radially outer surface of the tubular sleeve to provide mechanical strength to the teeth, the radial passages comprising fluid circulation galleries radially inward from the magnetic flux generators with fluid circulating in the fluid circulation galleries to provide heat exchange between the magnetic flux generators and the fluid circulating in the galleries, and wherein an inner surface of the tubular sleeve is smooth to reduce wind resistance.

2. An electrical machine as claimed in claim 1, wherein the outer surface of the rotor is smooth.

3. An electrical machine as claimed in claim 1, wherein the radial passages are delimited by stator teeth, an outer edge of the stator and the tubular sleeve.

4. An electrical machine as claimed in claim 2, wherein the radial passages are delimited by stator teeth, an outer edge of the stator and the tubular sleeve.

5. An electrical machine as claimed in claim 3, wherein the tubular sleeve is an insert integral with the stator teeth, comprising wedges or a cylindrical hoop.

6. An electrical machine as claimed in claim 4, wherein the tubular sleeve is an insert integral with the stator teeth, comprising wedges or a cylindrical hoop.

7. An electrical machine as claimed in claim 3, wherein the fluid circulation galleries are delimited by the stator teeth, the outer edge of the stator and the magnetic flux generators.

8. An electrical machine as claimed in claim 4, wherein the fluid circulation galleries are delimited by the stator teeth, the outer edge of the stator and the magnetic flux generators.

9. An electrical machine as claimed in claim 5, wherein the fluid circulation galleries are delimited by the stator teeth, the outer edge of the stator and the magnetic flux generators.

10. An electrical machine as claimed in claim 6, wherein the fluid circulation galleries are delimited by the stator teeth, the outer edge of the stator and the magnetic flux generators.

11. An electrical machine as claimed in claim 1, wherein the tubular sleeve comprises a ferromagnetic material.

12. An electrical machine as claimed in claim 2, wherein the tubular sleeve comprises a ferromagnetic material.

13. An electrical machine as claimed in claim 3, wherein the tubular sleeve comprises a ferromagnetic material.

14. An electrical machine as claimed in claim 5, wherein the tubular sleeve comprises a ferromagnetic material.

15. An electrical machine as claimed in claim 7, wherein the tubular sleeve comprises a ferromagnetic material.

16. An electrical machine as claimed in claim 1, wherein the tubular sleeve comprises a non-magnetic material.

17. An electrical machine as claimed in claim 2, wherein the tubular sleeve comprises a non-magnetic material.

18. An electrical machine as claimed in claim 3, wherein the tubular sleeve comprises a non-magnetic material.

19. An electrical machine as claimed in claim 5, wherein the tubular sleeve comprises a non-magnetic material.

20. An electrical machine as claimed in claim 7, wherein the tubular sleeve comprises a non-magnetic material.

21. An electrical machine as claimed in claim 1, wherein thickness of the tubular sleeve ranges between 0.1 mm and 5 mm.

22. An electrical machine as claimed in claim 1, wherein each radial passage comprises two magnetic flux generators.

23. An electrical machine as claimed in claim 22, wherein the magnetic flux generators are connected to electric phases and each radial passage comprises two magnetic flux generators connected to a same electrical phase.

24. An electrical machine as claimed in claim 22, wherein the magnetic flux generators are connected to electric phases, and a circumferential distribution of the radial passages comprises an alternation of radial passages including two magnetic flux generators connected to a same electric phase and of radial passages including two magnetic flux generators connected to two different electrical phases.

25. An electrical machine as claimed in claim 22, wherein the stator comprises twelve radial passages and the magnetic flux generators are connected to three electrical phases, and the circumferential distribution of the magnetic flux generators within the radial passages is as follows:
   a) a first radial passage comprising two magnetic flux generators connected to a first electrical phase;
   b) a second radial passage comprising a magnetic flux generator connected to a second electrical phase and a magnetic flux generator connected to the first electrical phase;
   c) a third radial passage comprises two magnetic flux generators connected to the second electric phase;
   d) a fourth radial passage comprises a magnetic flux generator connected to the third electrical phase and a magnetic flux generator connected to the second electric phase;
   e) a fifth radial passage comprises two magnetic flux generators connected to the third electric phase;

f) a sixth radial passage comprises a magnetic flux generator connected to the first electrical phase and a magnetic flux generator connected to the third electrical phase; and
g) seventh to twelfth radial passages disposed around the circumferential distribution are symmetrical to the first through sixth radial passages in relation to a center of the stator.

26. An electrical machine as claimed in claim 1, wherein the fluid is a liquid or gaseous fluid for cooling the electrical machine.

27. An electrical machine as claimed in claim 1, wherein the magnetic flux generators comprise armature windings.

28. An electrical machine as claimed in claim 1, comprising a compressor.

29. An electrical machine as claimed in claim 1, comprising a turbine.

30. An electrical machine as claimed in claim 1, comprising a turbine and a compressor.

* * * * *